United States Patent
Lund (10) Patent No.: US 11,292,603 B2
(45) Date of Patent: Apr. 5, 2022

(54) PASSENGER DOOR ARRANGEMENT FOR AN AIRCRAFT SEGMENT

(71) Applicant: Airbus Operations GmbH, Hamburg (DE)

(72) Inventor: Joerg Lund, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 264 days.

(21) Appl. No.: 16/555,288

(22) Filed: Aug. 29, 2019

(65) Prior Publication Data

US 2020/0070948 A1    Mar. 5, 2020

(30) Foreign Application Priority Data

Aug. 31, 2018  (DE) ...................... 10 2018 121 360.3
Aug. 31, 2018  (DE) ...................... 10 2018 121 363.8
Nov. 30, 2018  (DE) ...................... 10 2018 130 483.8

(51) Int. Cl.
    *B64D 25/08*    (2006.01)
    *B64C 1/14*     (2006.01)
    *B64D 25/14*    (2006.01)

(52) U.S. Cl.
    CPC ............ *B64D 25/08* (2013.01); *B64C 1/1423* (2013.01); *B64C 1/1461* (2013.01); *B64D 25/14* (2013.01)

(58) Field of Classification Search
    CPC ... B64C 1/1423; B64C 1/1461; B64C 1/1407; B64D 25/14; B64D 25/08
    See application file for complete search history.

(56) References Cited

U.S. PATENT DOCUMENTS

| | | | | |
|---|---|---|---|---|
| 4,715,562 A | * | 12/1987 | Bokalot | B64C 1/1407 244/137.2 |
| 4,927,098 A | * | 5/1990 | Depeige | B64D 25/14 244/137.2 |
| 5,106,036 A | * | 4/1992 | Sepstrup | B64D 25/14 244/129.1 |
| 5,400,985 A | * | 3/1995 | Banks | B64D 25/14 182/48 |

(Continued)

FOREIGN PATENT DOCUMENTS

| | | |
|---|---|---|
| DE | 2029167 A1 | 12/1971 |
| FR | 2576217 A1 | 7/1986 |

OTHER PUBLICATIONS

Search report from corresponding German patent application No. 10 2018 121 360.3, dated Nov. 30, 2018.

(Continued)

*Primary Examiner* — Joshua J Michener
*Assistant Examiner* — Cindi M Curry
(74) *Attorney, Agent, or Firm* — Greer, Burns & Crain, Ltd.

(57) ABSTRACT

A passenger door arrangement for an aircraft segment, which arrangement comprises a passenger door that is configured to assume a raised state and a lowered state, and a girt bar for arming and disarming an escape slide, the girt bar not altering its position relative to the passenger door in the transition from disarming to arming when the passenger door is in the lowered state. Also an aircraft segment, which comprises the passenger door portion and a fuselage portion, an external engagement means being fixed to the fuselage portion.

13 Claims, 4 Drawing Sheets

(56) References Cited

U.S. PATENT DOCUMENTS

| | | | | |
|---|---|---|---|---|
| 5,738,303 A * | 4/1998 | Hamatani | ............... | B64D 25/14 244/129.1 |
| 2015/0034769 A1* | 2/2015 | Minchau | ................ | B64D 25/14 244/137.2 |

OTHER PUBLICATIONS

Search report from corresponding German patent application No. 10 2018 130 483.8, dated Jan. 28, 2019.
Examination report from corresponding German patent application No. 10 2018 130 483.8, dated Jan. 28, 2019.

* cited by examiner

PASSENGER DOOR ARRANGEMENT FOR AN AIRCRAFT SEGMENT

CROSS-REFERENCES TO RELATED APPLICATIONS

This application claims priority from German Patent Application No. 10 2018 121 360.3 filed Aug. 31, 2018, German Patent Application No. 10 2018 121 363.8 filed Aug. 31, 2018, and German Patent Application No. 10 2018 130 483.8 filed Nov. 30, 2018 the entireties of both of which are incorporated herein by reference.

FIELD OF THE INVENTION

The present invention relates to a passenger door arrangement for an aircraft segment, which arrangement, in particular, comprises an escape slide kinematics, for example driven by a Bowden cable, having transfer of a secondary interface component realized, for example, in the form of a sliding block, instead of a main interface component realized, for example, in the form of a girt bar. The invention additionally relates to an aircraft segment equipped with such a passenger door arrangement.

BACKGROUND OF THE INVENTION

When the passenger door of a commercial aircraft is closed, locked and secured, an escape slide can usually be armed manually from inside by a selector lever mechanism provided in the region of an inner side of the passenger door. A girt bar functions as a main interface portion, when the escape slide is connected to the girt bar. When the escape slide is in the armed state, the girt bar, as a result of movement of the girt bar itself, engages in a fuselage portion that accommodates the passenger door and that is realized, for example, in the form of a door frame portion. When the passenger door is then opened in the emergency situation, the girt bar is released from the passenger door by the lifting movement, but remains in engagement with the fuselage portion. The escape slide is thereby securely attached to the aircraft structure for use.

Moreover, during the raising of the passenger door, a frame of the girt bar can be moved back into the closed position, by means of spring force, by a fuselage-side device, such that a possible inwardly directed movement of the girt bar is prevented.

The present invention is directed towards an object of specifying a passenger door arrangement for an aircraft segment, and an aircraft segment, that are equipped with an escape slide securing system of a simple and space-saving design.

SUMMARY OF THE INVENTION

This object may be achieved by a passenger door arrangement having the features of one or more embodiments described herein, and by an aircraft segment having the features of one or more embodiments described herein.

A passenger door arrangement for an aircraft segment comprises a passenger door. The passenger door can be moved, relative to a fuselage portion that accommodates the passenger door, between a raised position and a lowered position. The fuselage portion may be realized, for example, in the form of a door frame, and have a door opening that accommodates the passenger door. The passenger door arrangement additionally comprises a "girt bar", for arming or disarming an escape slide. The girt bar can be connected to the passenger door and/or to the fuselage portion by a connection arrangement. Accordingly, an escape slide connected to the girt bar can optionally be connected to the passenger door and/or to the fuselage portion by means of the connection arrangement.

The connection arrangement is configured, in the case of arming of the girt bar, to hold the girt bar fixed relative to the passenger door when it is in its lowered position. In other words, in the case of the passenger door arrangement, in the transition from disarming to arming of the escape slide, when the passenger door is in the lowered state, the position of the girt bar relative to the passenger door is not altered.

The passenger door arrangement avoids a complex interface between passenger door, girt bar, and fuselage, which can result in difficult or complex handling, and also in interruptions during production and servicing. In particular, it is possible to dispense with a complex kinematics resulting from the transfer of the girt bar between the passenger door and the escape slide. The escape slide securing system of the passenger door arrangement is therefore lightweight, of simple design, and robust in respect of handling and tolerances.

Preferably, the connection arrangement is configured to connect the girt bar to the passenger door when the escape slide is in the disarmed state. Unintentional deployment of the escape slide upon opening of the passenger door is thereby reliably avoided. In addition or as an alternative to this, the connection arrangement is configured to connect the girt bar to the fuselage portion when the escape slide is in the armed state. It is thereby ensured that, in an emergency situation, the escape slide is securely connected to the fuselage portion and is fully operational.

The connection arrangement preferably comprises a mechanism that is configured to releasably lock and fix the girt bar to an external engagement means. The external engagement means can preferably be fastened to the fuselage portion. As a result of the mechanism of the connection arrangement acting in combination with the external engagement means, the girt bar can be securely connected to the fuselage portion when the escape slide is in the armed state.

For example, the mechanism of the connection arrangement may be able to be connected to the girt bar in such a manner that the mechanism alters its position relative to the girt bar only in a sliding direction, in a limited region. As a result, the mechanism has a small structural space requirement, and is less susceptible to malfunction.

In a first variant, the mechanism may be realized as one piece. When the passenger door is in the raised and in the lowered state, before and during the transition from disarming to arming of the escape slide, when the passenger door is in the lowered state, the mechanism is then preferably fastened to the passenger door. Following arming of the escape slide, on the other hand, when the passenger door is in the raised state, the mechanism, realized as one piece, is preferably released from the passenger door and instead fastened to the fuselage portion. Consequently, in the case of a one-piece mechanism, the mechanism is optionally fastened to the passenger door or to the fuselage portion, depending on the operating state of the escape slide.

As an alternative to this, however, the mechanism may also be realized as two pieces, and comprise a first element, fastened to the passenger door, and a second element, which can be fastened to the fuselage portion. When the passenger door is in the raised and the lowered state, before and during the transition from disarming to arming of the escape slide, when the passenger door is in the lowered state, the first element of the mechanism is preferably connected to the girt bar. Following arming of the escape slide, on the other hand, when the passenger door is in the raised state, the first element of the mechanism is preferably released from the escape slide. By contrast, when the passenger door is in the raised and the lowered state, before and during the transition from disarming to arming of the escape slide, when the passenger door is in the lowered state, the second element may be released from the girt bar. Following arming of the escape slide, by contrast, when the passenger door is in the raised state, the second element of the mechanism is preferably connected to the girt bar.

Consequently, in the case of a mechanism realized as two pieces, the elements of the mechanism are not optionally fastened to the passenger door or to the fuselage portion, depending on the operating state of the escape slide. Rather, the first element of the mechanism is always fastened to the passenger door, irrespective of the operating state of the escape slide, while the second element of the mechanism is always fastened to the fuselage portion, irrespective of the operating state of the escape slide. Accordingly, in the case of a mechanism realized as two pieces, the "transfer" of the girt bar from the passenger door to the fuselage portion is effected, not by the "transfer" of the mechanism from the passenger door to a fuselage portion, but by the "transfer" of the girt bar from the first element of the mechanism, which is fastened to the passenger door, to the second element of the mechanism, which is fastened to the fuselage portion.

The passenger door arrangement may preferably additionally comprise a Bowden cable, which at one end is connected to a selection lever mechanism provided in the region of an inner side of the passenger door arrangement, and at its other end is connected to the connection arrangement, i.e. to the mechanism of the connection arrangement, and which is configured to activate and ensure the arming or disarming of the escape slide. When the door arrangement has been mounted in the aircraft segment, the selection lever mechanism is accessible to a user, for example a flight attendant, present in an aircraft cabin.

The connection arrangement may additionally comprise a first lock, fastened to the passenger door. The first lock may be configured to fix the one-piece mechanism or the first element of the two-piece mechanism in its position, at least when the passenger door is in the raised state, before the transition from disarming to arming of the escape slide. Further, the first lock may be configured to go into engagement with the external engagement means when the passenger door is in the lowered state, in order to release the one-piece mechanism from the passenger door or to release the first element of the two-piece mechanism from the girt bar.

If the connection arrangement comprises a mechanism realized as one piece, the first lock is thus preferably configured to fix the mechanism as a whole in its position on the passenger door, when the passenger door is in the raised state, before the transition from disarming to arming of the escape slide, but, when the passenger door is in the lowered state, to go into engagement with the external engagement means and thereby to release the one-piece mechanism as a whole from the passenger door. If, on the other hand, the mechanism is realized in the form of a two-piece mechanism, the first lock is preferably realized such that it fixes the first element of the two-piece mechanism to the passenger door also when the passenger door is in the raised state, following the transition from disarming to arming of the escape slide. When the passenger door is in the lowered state, however, the first locking means, acting in combination with the external engagement means, causes the first element of the two-piece mechanism to be released from the girt bar.

In a preferred embodiment of the passenger door arrangement, the mechanism realized as one piece is a displaceable slider realized as one piece. The one-piece displaceable slider then preferably comprises a first portion, which is arranged substantially parallel to the direction of displacement of the slider and above the girt bar. Additionally or alternatively, the one-piece slider may comprise a second portion, which is arranged substantially perpendicularly in relation to the direction of displacement of the slider and to the side of the girt bar. Finally, the one-piece slider may comprise a third portion, which is arranged substantially parallel to the direction of displacement of the slider and beneath the girt bar.

The slider is preferably arranged and is displaceable such that, before the transition from disarming to aiming, the first portion does not cross the main direction of movement of the girt bar, and the third portion crosses the main direction of movement of the girt bar, such that the displaceable slider is not in engagement with the girt bar. Additionally or alternatively, the slide may be arranged such that, following the transition from disarming to arming, the first portion and the third portion each cross the main direction of movement of the girt bar, such that the displaceable slider is in engagement with the girt bar.

A mechanism realized as two pieces, on the other hand, is preferably embodied in the form of a displaceable slider realized as two pieces. The two-piece displaceable slider preferably comprises a first sub-component, having a first portion, which is arranged substantially parallel to the direction of displacement of the first sub-component and, when the first sub-component has been connected to the girt bar, is arranged above the girt bar. Further, the first sub-component may comprise a second portion, which is arranged substantially perpendicularly in relation to the direction of displacement of the first sub-component and, when the first sub-component has been connected to the girt bar, is arranged to the side of the girt bar. Finally, the first sub-component may comprise a third portion, which is arranged substantially parallel to the direction of displacement of the first sub-component and, when the first sub-component has been connected to the girt bar, is arranged beneath the girt bar.

The first sub-component of the slider realized as two pieces is preferably arranged and is displaceable such that, before the transition from disarming to arming, the first portion and the third portion each cross the main direction of movement of the girt bar, such that the first sub-component of the two-piece displaceable slider is in engagement with the girt bar. Following the transition from disarming to arming, on the other hand, preferably neither the first portion nor the third portion crosses the main direction of movement of the girt bar, such that the first sub-component of the two-piece displaceable slider is not in engagement with the girt bar.

Furthermore, a two-piece displaceable slider may comprise a second sub-component, having a first portion, which is arranged substantially parallel to the direction of displacement of the first sub-component and, when the first sub-component has been connected to the girt bar, is arranged above the girt bar. Further, the second sub-component may comprise a second portion, which is arranged substantially perpendicularly in relation to the direction of displacement of the second sub-component and, when the second sub-component has been connected to the girt bar, is arranged to the side of the girt bar. Finally, the second sub-component may comprise a third portion, which is arranged substantially parallel to the direction of displacement of the second sub-component and, when the second sub-component has been connected to the girt bar, is arranged beneath the girt bar.

The second sub-component of the slider realized as two pieces is preferably arranged and is displaceable such that, before the transition from disarming to arming, neither the first portion nor the third portion crosses the main direction of movement of the girt bar, such that the second sub-component of the two-piece displaceable slider is not in engagement with the girt bar. Following the transition from disarming to arming, on the other hand, the first portion and the third portion cross the main direction of movement of the girt bar, such that the second sub-component of the two-piece displaceable slider is in engagement with the girt bar.

If the connection arrangement comprises a mechanism realized in the form of a two-piece slider, the girt bar is consequently transferred, depending on the operating state of the escape slide, between the first sub-component of the two piece slider that is fastened to the passenger door and the second sub-component of the two-piece slider that is fastened to the fuselage portion. Whereas the first sub-component of the two-piece slider fixes the girt bar to the passenger door before the transition from disarming to arming of the escape slide, following the transition from disarming to arming the first sub-component is released, as a result of its displacement movement, from the girt bar. Instead, the second sub-component, as a result of its displacement movement, then goes into engagement with the girt bar, and thereby fastens the girt bar to the fuselage portion.

An aircraft segment comprises a passenger door arrangement, described above, and the fuselage portion, the external engagement means being fixed to the fuselage portion.

The external engagement means may comprise a first pin, which is configured to go into engagement with the first lock, and to raise the first lock in such a manner that the one-piece mechanism is released from the passenger door, or the first element of the two-piece mechanism is released from the girt bar. If the connection arrangement comprises a mechanism realized as one piece, the action of the first pin of the external engagement means in combination with the first lock consequently causes the one-piece mechanism as a whole to be released from the passenger door. If, on the other hand, the mechanism is realized in the form of a two-piece mechanism, the action of the first pin of the external engagement means in combination with the first lock causes the first element of the two-piece mechanism to be released from the girt bar.

Further, the external lock may comprise a second lock, which is fastened to the fuselage portion. The connection arrangement may additionally comprise a second pin, which is configured to go into engagement with the second lock when the passenger door is in the lowered state. When the escape slide is in the armed state, in the case of the passenger door being brought out of its lowered state and into its raised state, the second pin is preferably configured to raise the second lock, in such a manner that the one-piece mechanism or the second element of the two-piece mechanism becomes fixed in engagement with the girt bar. If the connection arrangement comprises a mechanism realized as one piece, the action of the second pin in combination with the second lock of the external engagement means consequently causes the one-piece mechanism as a whole to be fixed in engagement with the girt bar. If, on the other hand, the mechanism is realized in the form of a two-piece mechanism, the action of the second pin in combination with the second lock of the external engagement means causes the second element of the two-piece mechanism to be fixed in engagement with the girt bar.

BRIEF DESCRIPTION OF THE DRAWINGS

The accompanying drawings show an exemplary embodiment of the invention, to which, however, the present invention is not to be limited in any manner. In the drawings, elements that are the same or similar are denoted by the same references. It is to be pointed out that the representation of individual elements does not preclude the possibility that the respective fundamental functionality can be implemented in a plurality of elements. There are shown.

DETAILED DESCRIPTION OF THE PREFERRED EMBODIMENTS

In the following description, for the purpose of explanation, but not limitation, specific details are described in order to ensure a basic understanding of the technique presented here. For the average person skilled in the art, it is evident that the present technique may be implemented in other exemplary embodiments that differ from these specific details.

Figure 1:
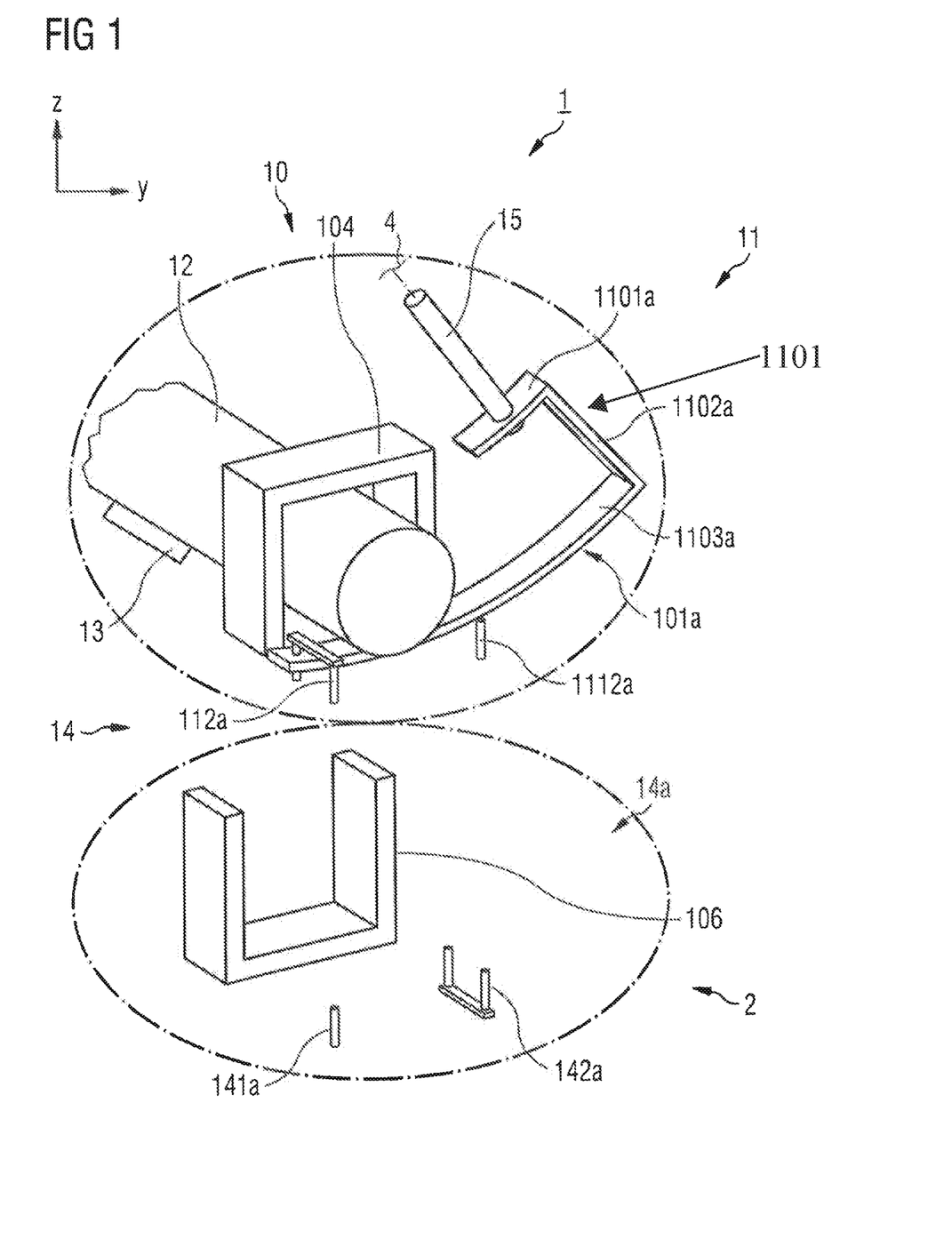
FIG. 1 is a schematic sketch of an aircraft segment, realized according to a first exemplary embodiment of the present invention, which comprises a passenger door arrangement equipped with an escape slide kinematics.

FIG. 1 shows an aircraft segment 1 equipped with a passenger door arrangement 10, the outer shapes of the passenger door arrangement 10 and of the aircraft segment 1 being indicated only schematically. The passenger door arrangement 10 comprises a passenger door 11, likewise indicated only schematically, which is configured to assume a raised state and a lowered state. In particular, the passenger door 11 can be moved, relative to a fuselage portion 2 of the aircraft segment 1 that accommodates the passenger door 11 and that, for example, may be realized in the form of a door frame provided with a door opening, and that is likewise indicated only schematically in FIG. 1, between a raised position and a lowered position.

The passenger door arrangement 10 additionally comprises a girt bar 12 for arming or disarming an escape slide 13. For this purpose, the girt bar 12, as a main interface part, is connected to the escape slide 13, which in FIG. 1 is likewise indicated only schematically. The girt bar 12 can be connected to the passenger door 11 and/or to the fuselage portion 2 by a connection arrangement 14, which is illustrated in detail in FIG. 1. Represented in an upper region of FIG. 1 are components of the connection arrangement 14 on the passenger door side, i.e. components assigned to the passenger door 11, while a lower region of FIG. 1 shows components of the connection arrangement 14 on the fuselage portion side, i.e. components assigned to the fuselage portion 2.

In the case of the passenger door arrangement 10, the position of the girt bar 12 relative to the passenger door 11 is invariable in the transition from disarming to arming of the escape slide 13, when the passenger door 11 is in the lowered state. In other words, in the case of arming of the escape slide 13, the girt bar 12 is held fixed by the connection arrangement 14, relative to the passenger door 11 in its lowered position. As is explained in yet greater detail in the following, the connection means 14 is configured to connect the girt bar 12 to the passenger door 11 when the escape slide 13 is in the disarmed state. When the escape slide 13 is in the armed state, by contrast, the connection arrangement 14 connects the girt bar 12 to the fuselage portion 2.

The connection arrangement 14 of the passenger door arrangement 10 comprises a mechanism 101a, which is configured to releasably lock and fix the girt bar 12 to an external engagement means 14a of the connection arrangement 14 that is fastened to the fuselage portion 2. It is to be emphasized that, in the case of the escape slide kinematics illustrated in FIGS. 1 and 2, the mechanism 101a is realized as one piece, and is a constituent part of the passenger door 11, and not of the fuselage portion 2, of another part of the fuselage, or of a cabin floor. The mechanism 101a can be connected to the girt bar 12 in such a manner that the mechanism 101a alters its position relative to the girt bar 12 only in a sliding direction, in a limited region (cf. FIGS. 2A to 2D).

When the passenger door 11 is in the raised and in the lowered state, before and during the transition from disarming to arming of the escape slide 13, when the passenger door 11 is in the lowered state, the mechanism 101a realized as one piece is fastened to the passenger door 11. However, following arming of the escape slide 13, when the passenger door 11 is in the raised state, the mechanism 101a realized as one piece is released from the passenger door 11. A movement of the girt bar 12 in a y direction and a z direction upon the transfer of the escape slide 13 from being fastened to the passenger door side to being fastened to the fuselage portion is prevented by a first fixing element 104 of the connection arrangement 14 on the passenger door side, i.e. fixed to the passenger door 11, and a second fixing element 106 of the connection arrangement 14 on the fuselage portion side, i.e. fixed to the fuselage portion 2.

The passenger door arrangement 10 additionally comprises a Bowden cable 15, which, at one end, is connected to a selector level mechanism 4 attached in the region of an inner side of the passenger door arrangement 10, and at its other end is connected to the mechanism 101a of the connection arrangement 14 forming the escape slide securing system. Upon an actuation of the selector lever mechanism 4, an actuating force, by which the arming or disarming of the escape slide 13 is effected, is transmitted to the Bowden cable 15.

In the exemplary embodiment of the passenger door arrangement 10 shown in FIGS. 1 and 2, the mechanism 101a is implemented in the form of a one-piece slider 1101 that is displaceable relative to the girt bar 12. The displaceable one-piece slider 1101 comprises a first portion 1101a, which is arranged substantially parallel to the direction of displacement of the slider and above the girt bar 12, a second portion 1102a, which is arranged substantially perpendicularly in relation to the direction of displacement of the slider and to the side of the girt bar 12, and a third portion 1103a, which is arranged substantially parallel to the direction of displacement of the slider and beneath the girt bar 12.

The components of the connection arrangement 14 on the passenger door side additionally comprise a first lock 112a, fastened to the passenger door 11. On the fuselage portion side, on the other hand, the connection arrangement 14, i.e. the external engagement means 14a, comprises a second lock 142a, and a fixed first pin 141a, which extends in the direction of the components of the connection arrangement 14 on the passenger door 11 side. On the passenger door 11 side, the connection arrangement 14 comprises a second pin 1112a, fastened to the passenger door 11, which extends in the direction of the components of the connection arrangement 14 on the fuselage portion side.

Consequently, the one-piece slider may be described as an irregular C-profile (or sliding block), which comprises a long portion 1103a and a short portion 1101a; the long portion 1103a may serve as a guide for the displacement movement, while the short portion 1101a, as is explained in yet greater detail in the following, defines the engagement/non-engagement of the slider with the first or second lock 112a or 142a—and thus the arming/disarming of the escape slide 13.

In the following, the functioning of the escape slide kinematics illustrated in FIG. 1, and in particular of the connection arrangement 14 for arming the escape slide 13, when the passenger door 11 is in the raised state, is explained, in four steps, with reference to FIGS. 2A to 2D.

Figure 2A:
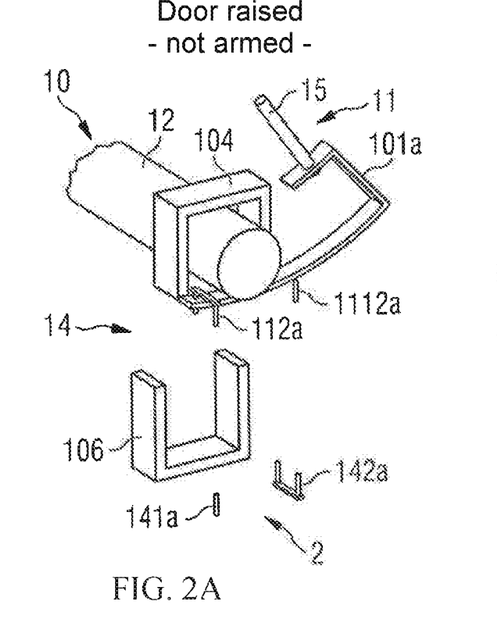
FIGS. 2A to 2D are an application of the escape slide kinematics illustrated in FIG. 1, in four steps, for arming of the escape slide, a passenger door of the passenger door arrangement being at first in a raised position.

When the passenger door 11 is in the raised state shown in FIG. 2A, before the transition from disarming to arming of the escape slide 13, the first portion 1101a of the mechanism 101a realized in the form of a one-piece slider does not cross the main direction of movement of the girt bar 12, while the third portion 1103a of the mechanism 101a realized in the form of a one-piece slider crosses the main direction of movement of the girt bar 12, such that the displaceable one-piece slider is not in engagement with the girt bar 12. In addition, the first lock 112a fixes the mechanism 101a in its position on the passenger door 11. A movement of the girt bar 12 in the y direction and z direction is prevented by the first fixing element 104. Thus, when the escape slide 13 is in the disarmed state, the girt bar 12 is fixed to the passenger door 11.

Figure 2B:
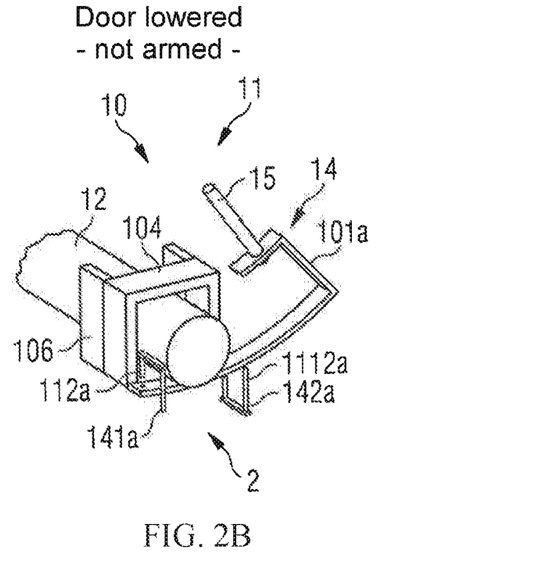

If then, as shown in FIG. 2B, the passenger door 11 is lowered relative to the fuselage portion 2, the first lock 112a goes into engagement with the external engagement means 14a. In particular, the first pin 141a of the external engagement means 14a comes to bear against the first lock 112a, and raises the first lock 112a in such a manner that the displaceable one-piece slider and the first lock 112a come out of engagement. At the same time, the second pin 1112a keeps the one-piece slider and the second lock 142a of the external engagement means 14a still out of engagement.

When the passenger door 11 is closed, locked and secured, the escape slide 13 can be armed manually from the inside by the selector lever mechanism 4. The necessary force is transmitted from the selector lever mechanism 4, by means of the Bowden cable 15, to the lower interface region of the escape slide kinematics. In particular, the arming of the escape slide 13 is achieved by a displacement of the mechanism 101a, realized in the form of a one-piece slider, into the position shown in FIG. 2C (transfer of the secondary interface part). When the one-piece slider has attained the position illustrated in FIG. 2C, the second pin 1112a goes into engagement with the second lock 142a. At the same time, the action of the fixed pin 141a on the fuselage portion side in combination with the first lock 112*a* continues to separate the one-piece slider from the passenger door 11.

Figure 2C:
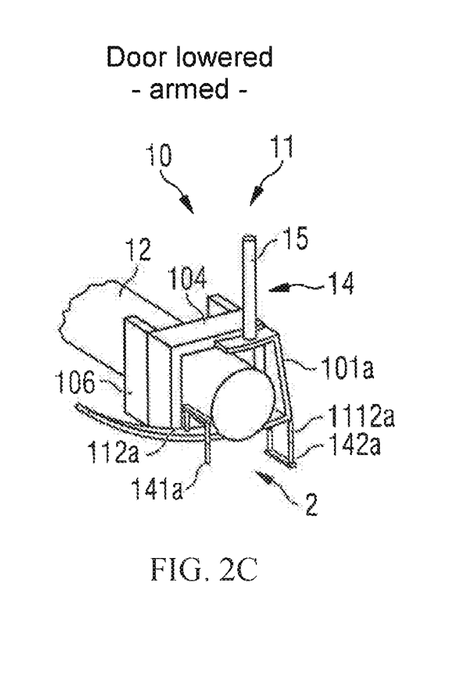

Following the transition from disarming to arming, the first portion 1101*a* and the third portion 1103*a* of the one-piece slider each cross the main direction of movement of the girt bar 12, such that the displaceable slider is in engagement with the girt bar 12. A movement of the girt bar 12 in the y direction and z direction is prevented, when the passenger door 11 is lowered, by the first fixing element 104 and the second fixing element 106.

Figure 2D:
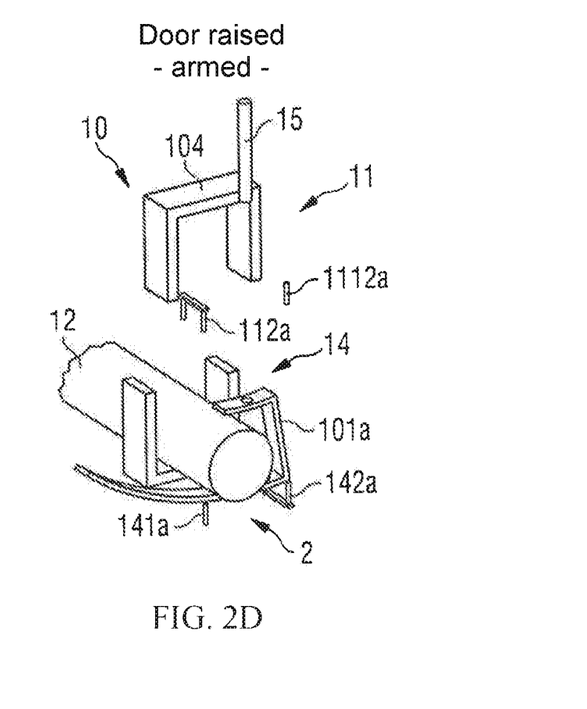

If the passenger door 11 is then raised, as illustrated in FIG. 2D, the components of the connection arrangement 14 fixed to the passenger door 11 are released from the components of the connection arrangement 14 that are fixed to the fuselage portion 2. In this case, the second pin 1112*a* raises the second lock 142*a* in such a manner that the one-piece slider is fixed in engagement with the girt bar 12. An inadvertent transfer back to the disarmed state is thus prevented. At the same time, the one-piece slider, and thus the girt bar 12, becomes fixed to the fuselage portion 2 by the second lock 142*a*. The escape slide 13 is thus securely attached to the structure of the aircraft segment 1 for the purpose of deployment. A movement of the girt bar 12 in the y direction and z direction is then prevented by the second fixing element 106.

Figure 3:
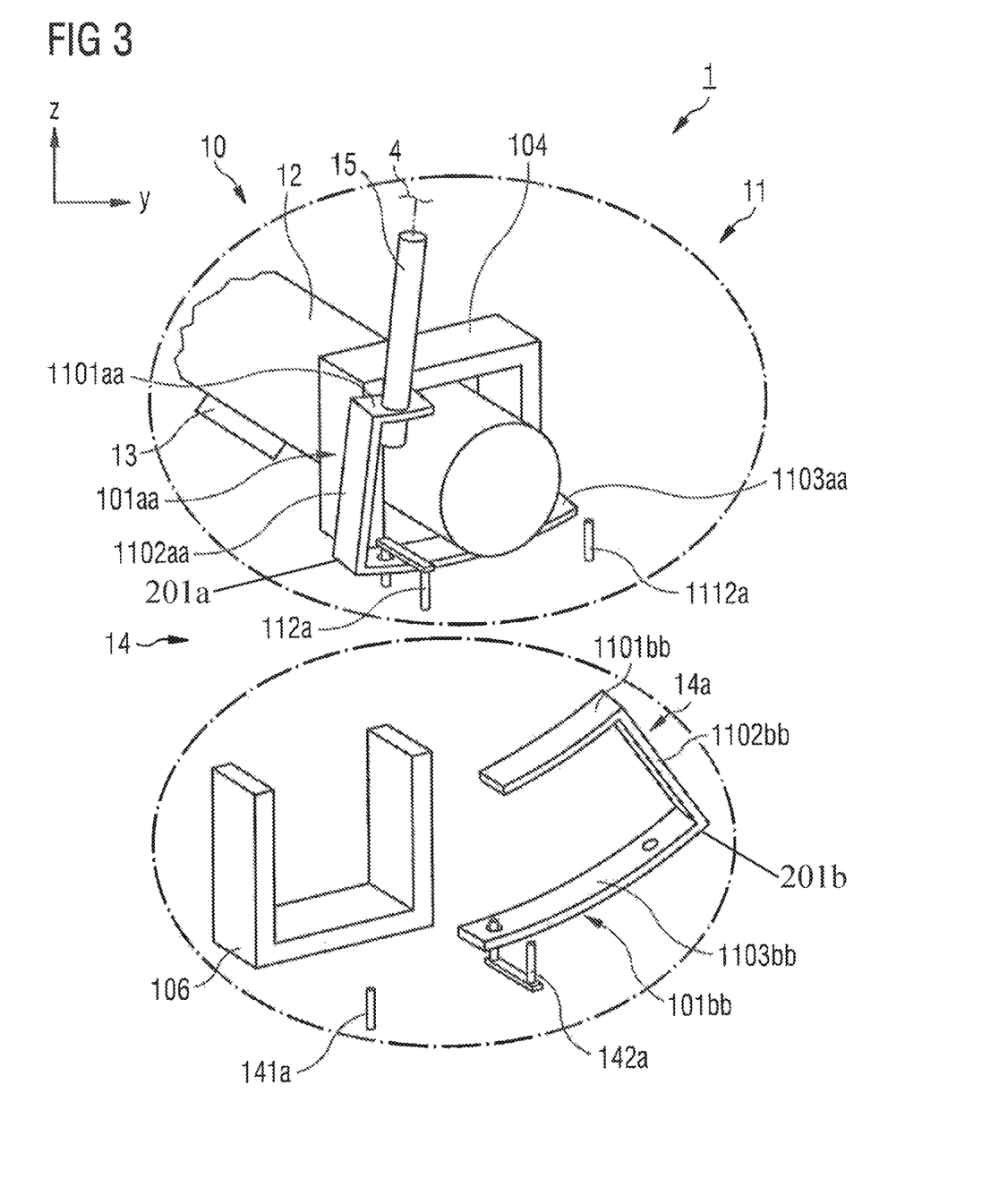
FIG. 3 is a schematic sketch of an aircraft segment, realized according to a second exemplary embodiment of the present invention, which comprises a passenger door arrangement equipped with an alternative escape slide kinematics; and, FIGS. 4A to 4D are an application of the alternative escape slide kinematics illustrated in FIG. 3, in four steps, for arming of the escape slide, a passenger door of the passenger door arrangement being at first in a raised position.

The variant of a passenger door arrangement 10 shown in FIGS. 3 and 4 differs from the arrangement according to FIGS. 1 and 2 in that the connection arrangement 14 comprises, not a one-piece, but a two-piece, mechanism 101*a*. The mechanism 101*a* realized as two pieces, for its part, comprises a first element 101*aa*, which is fastened to the passenger door 11, and a second element 101*bb*, which is fastened to the fuselage portion 2. However, each of the two elements 101*aa*, 101*bb* of the mechanism 101*a* realized as two pieces can still be connected to the girt bar 12, in such a manner that it alters its position relative to the girt bar 12 only in a sliding direction, in a limited region (cf. FIGS. 2A to 2D).

When the passenger door 11 is in the raised and in the lowered state, before and during the transition from disarming to arming of the escape slide 13, when the passenger door 11 is in the lowered state, the first element 101*aa* of the mechanism 101*a* realized as two pieces is connected to the girt bar 12. Following arming of the escape slide 13, however, when the passenger door 11 is in the raised state, the first element 101*aa* of the mechanism 101*a* realized as two pieces is released from the girt bar 12. In contrast thereto, before and during the transition from disarming to arming of the escape slide 13, the second element 101*bb* of the mechanism 101*a* realized as two pieces is released from the girt bar, but following arming of the escape slide 13, when the passenger door 11 is in the raised state, is connected to the girt bar 12. The second lock 142*a* serves to connect the second element 101*bb* to the fuselage portion 2.

In this case, as in the case of the connection arrangement 14 having a one piece mechanism 101*a*, shown in FIGS. 1 and 2, a movement of the girt bar 12 in a y direction and a z direction, upon the transfer of the escape slide 13 from a passenger-door side fastening to a fuselage-portion side fastening, is prevented by the passenger-door side first fixing element 104, and by the fuselage-portion side second fixing element 106 of the connection arrangement 14. The Bowden cable 15 is fastened to the first element 101*aa* of the mechanism 101*a* realized as two pieces, but otherwise functions as described above with reference to FIGS. 1 and 2.

In the exemplary embodiment of the passenger door arrangement 10 shown in FIGS. 3 and 4, the two-piece mechanism 101*a* is implemented in the form of a two-piece slider, which is displaceable relative to the girt bar 12, having a first sub-component 201*a* and a second sub-component 201*b*. The first element 101*aa* of the two-piece mechanism 101*a*, which is formed here by the first sub-component 201*a* of the displaceable two-piece slider, comprises a first portion 1101*aa*, which is arranged substantially parallel to the direction of displacement of the first sub-component 201*a* and, when the first sub-component 201*a* has been connected to the girt bar 12, is arranged above the girt bar 12. The first element 101*aa* of the two-piece mechanism 101*a*, which is formed here by the first sub-component 201*a* of the displaceable two-piece slider, additionally comprises a second portion 1102*aa*, which is arranged substantially perpendicularly in relation to the direction of displacement of the first sub-component 201*a* and, when the first sub-component 201*a* has been connected to the girt bar 12, is arranged to the side of the girt bar 12. Finally, the first element 101*aa* of the two-piece mechanism 101*a*, which is formed here by the first sub-component 201*a* of the displaceable two-piece slider, comprises a third portion 1103*aa*, which is arranged substantially parallel to the direction of displacement of the first sub-component 201*a* and, when the first sub-component 201*a* has been connected to the girt bar 12, is arranged beneath the girt bar 12.

The second element 101*bb* of the two-piece mechanism 101*a*, which is formed here by the second sub-component 201*b* of the displaceable two-piece slider, comprises a first portion 1101*bb*, which is arranged substantially parallel to the direction of displacement of the second sub-component 201*b* and, when the second sub-component 201*b* has been connected to the girt bar 12, is arranged above the girt bar 12. The second element 101*bb* of the two-piece mechanism 101*a*, which is formed here by the second sub-component 201*b* of the displaceable two-piece slider, additionally comprises a second portion 1102*bb*, which is arranged substantially perpendicularly in relation to the direction of displacement of the second sub-component 201*b* and, when the second sub-component 201*b* has been connected to the girt bar 12, is arranged to the side of the girt bar 12. Finally, the second element 101*bb* of the two-piece mechanism 101*a*, which is formed here by the second sub-component 201*b* of the displaceable two-piece slider, comprises a third portion 1103*bb*, which is arranged substantially parallel to the direction of displacement of the second sub-component 201*b* and, when the second sub-component 201*b* has been connected to the girt bar 12, is arranged beneath the girt bar 12.

The passenger-door side components of the connection arrangement 14 illustrated in FIGS. 3 and 4 do not differ from the components of the connection arrangement 14 according to FIGS. 1 and 2. Moreover, each of the two sub-components of the two-piece slide may be described as an irregular C-profile (or sliding block), which respectively comprise a long portion 1103*aa*, 1103*bb* and a short portion 1101*aa*, 1101*bb*; the long portion 1103*aa*, 1103*bb* can in each case serve as a guide for the displacement movement, while the short portion 1101*aa*, 1101*bb*, as explained in yet greater detail in the following, in each case defines the engagement/non-engagement of the slider with the first or the second lock 112*a* or 142*a*—and thus the arming/disarming of the escape slide 13.

In the following, the functioning of the escape slide 13 kinematics illustrated in FIG. 3, and in particular of the connection arrangement 14 for arming the escape slide 13, when the passenger door 11 is in the raised state, is explained, in four steps, with reference to FIGS. 4A to 4D.

Figure 4A:
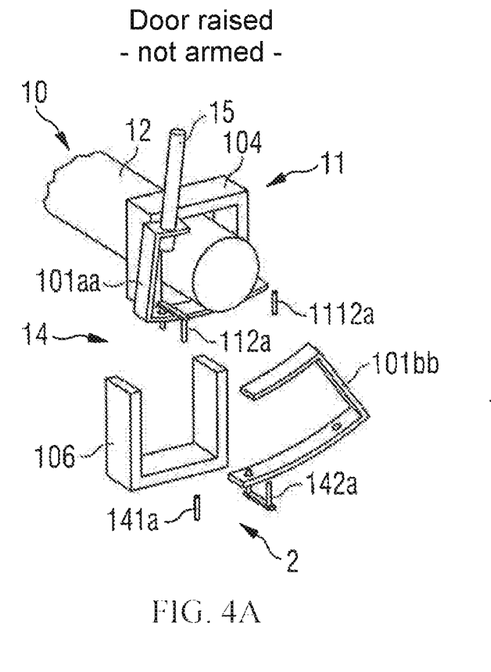

When the passenger door 11 is in the raised state shown in FIG. 4A, before the transition from disarming to arming of the escape slide 13, the first element 101aa of the two-piece mechanism 101a, which is formed here by the first sub-component of the displaceable two-piece slider, is connected to the girt bar 12. In particular, both the first portion 1101aa and the third portion 1103 of the first sub-component each cross the main direction of movement of the girt bar 12, such that the first sub-component is in engagement with the girt bar 12. In addition, the first lock 112a fixes the first sub-component in its position on the passenger door 11. A movement of the girt bar 12 in the y direction and z direction is prevented by the first fixing element 104. When the escape slide 13 is in the disarmed state, the girt bar 12 is thus fixed to the passenger door 11 by means of the first sub-component.

Figure 4B:
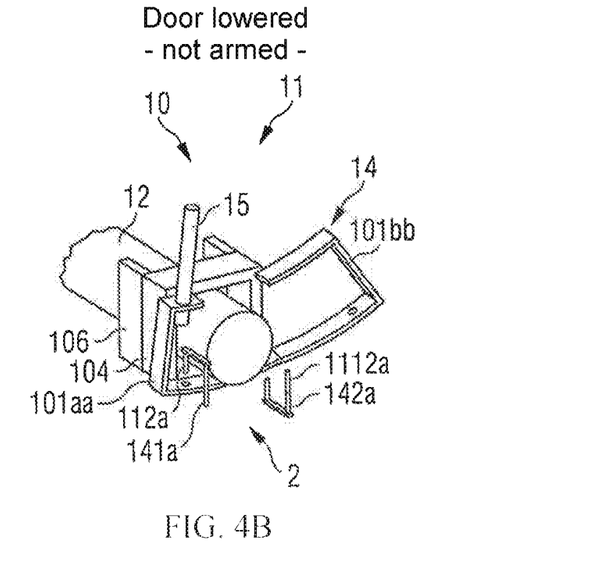

If then, as shown in FIG. 4B, the passenger door 11 is lowered relative to the fuselage portion 2, the first lock 112a goes into engagement with the external engagement means 14a. In particular, the first pin 141a of the external engagement means 14a comes to bear against the first lock 112a, and raises the first lock 112a in such a manner that the first sub-component and the first lock 112a come out of engagement. At the same time, the second pin 1112a keeps the second element 101bb of the two-piece mechanism 101a, which is formed here by the second sub-component of the displaceable two-piece slider, and the second lock 142a of the external engagement means 14a still out of engagement. Furthermore, the two sub-components of the displaceable two-piece slider are connected to each other.

When the passenger door 11 is closed, locked and secured, the escape slide 13 can be armed manually from the inside by the selector lever mechanism 4. The necessary force is transmitted from the selector lever mechanism 4, by means of the Bowden cable 15, to the lower interface region of the escape slide kinematics. In particular, the arming of the escape slide 13 is achieved by a displacement of the mechanism 101a, realized in the form of a one-piece slider, into the position shown in FIG. 4C. In this case the first sub-component of the displaceable two-piece slider is actuated directly by the Bowden cable 15, while, upon the movement of the first sub-component, the second sub-component of the displaceable two-piece slider is driven by the first sub-component.

Figure 4C:
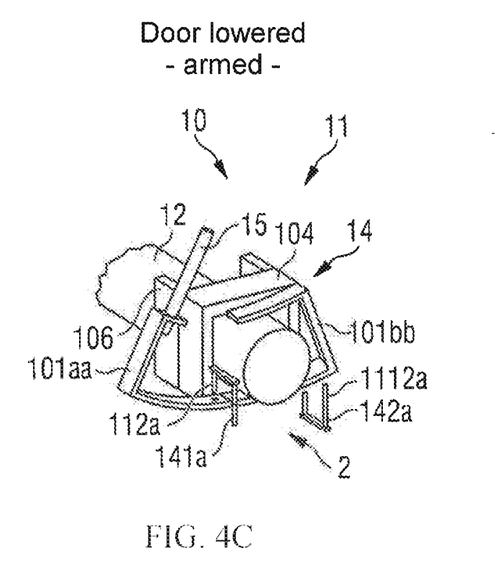

When the two-piece mechanism 101a, realized as a displaceable two-piece slider, has attained the position shown in FIG. 4C, the first sub-component of the two-piece slider is arranged relative to the girt bar 12 in such a manner that neither its first portion 1101aa nor its third portion 1103aa crosses the main direction of movement of the girt bar 12. The first sub-component is thus no longer in engagement with the girt bar 12. In contrast, the second sub-component of the two-piece slider is arranged relative to the girt bar 12 in such a manner that its first portion 1101bb and its third portion 1103bb cross the main direction of movement of the girt bar 12. The second sub-component is thus in engagement with the girt bar 12. A movement of the girt bar 12 in the y direction and z direction is prevented, when the passenger door 11 is lowered, by the first fixing element 104 and the second fixing element 106.

Figure 4D:
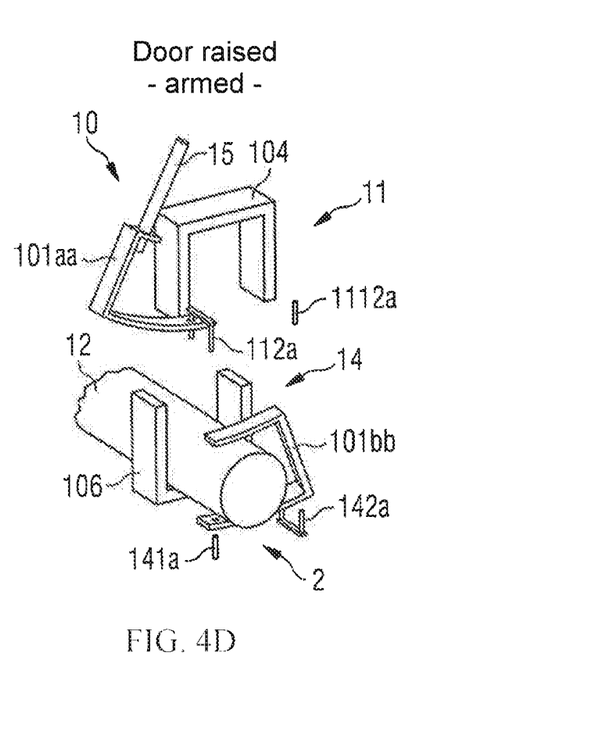

If the passenger door 11 is then raised, as illustrated in FIG. 4D, the components of the connection arrangement 14 fixed to the passenger door 11 are released from the components of the connection arrangement 14 that are fixed to the fuselage portion 2. In this case, the second pin 1112a raises the second lock 142a in such a manner that the second sub-component of the two-piece slider becomes fixed in engagement with the girt bar 12. An inadvertent transfer back to the disarmed state is thus prevented. At the same time, the second sub-component of the two-piece slider, and thus the girt bar 12, is fixed to the fuselage portion 2 by the second lock 142a. The escape slide 13 is thus securely attached to the structure of the aircraft segment 1 for the purpose of deployment. A movement of the girt bar 12 in the y direction and z direction is then prevented by the second fixing element 106.

The passenger door arrangement 10 described here is advantageous in at least some of the following points:

Lesser weight, owing to the reduced number of parts in the mechanism for arming (in particular owing to the use of the Bowden cable).

The girt bar always maintains the same position in relation to the escape slide, the door and the fuselage. Only the slide (as secondary interface) is transferred during the operation for arming/disarming, instead of the girt bar (as primary interface) during the operation for arming/disarming.

Reduced complexity of the mechanism for arming, with a positive effect on the production and assembly time.

More robust interface between the door, girt bar and fuselage in respect of handling and tolerance effects.

Fewer interruptions of production and servicing times.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger door arrangement for an aircraft segment, comprising:
   a passenger door, which configured to be moved, relative to a fuselage portion that accommodates the passenger door, between a raised position and a lowered position, and
   a girt bar, for arming or disarming an escape slide, configured to be connected to the passenger door, to the fuselage portion, or both by a connection arrangement, the connection arrangement being configured, in the case of arming of the escape slide, to hold the girt bar fixed relative to the passenger door when the girt bar is in a lowered position, and
   wherein the connection arrangement comprises:
   a mechanism that is configured to releasably lock and fix the girt bar to an external engagement means fastened to the fuselage portion, and
   wherein the mechanism comprises two pieces, the two pieces comprising a first element, fastened to the passenger door, and a second element, fastened to the fuselage portion,
   the first element of the mechanism, when the passenger door is in the raised and the lowered state, before and during the transition from disarming to arming of the escape slide, when the passenger door is in the lowered state, being connected to the girt bar and, following arming of the escape slide, when the passenger door is in the raised state, being released from the girt bar, and the second element of the mechanism, before and during the transition from disarming to arming of the escape slide, when the passenger door is in the lowered state, being released from the girt bar and, following arming of the escape slide, when the passenger door is in the raised state, being connected to the girt bar.

2. The passenger door arrangement as claimed in 1, wherein the connection arrangement is further configured: to connect the girt bar to the passenger door when the escape slide is in the disarmed state, to connect the girt bar to the fuselage portion when the escape slide is in the armed state, or both.

3. The passenger door arrangement as claimed in claim 1, wherein the mechanism is configured to be connected to the girt bar in such a manner that the mechanism alters a position of the mechanism relative to the girt bar only in a sliding direction in a limited region.

4. The passenger door arrangement as claimed in claim 1 further comprising:
a Bowden cable, which at one end is connected to a selector lever mechanism provided in a region of an inner side of the passenger door arrangement, and at a second end is connected to the mechanism, and which is configured to activate the arming or disarming of the escape slide.

5. The passenger door arrangement as claimed in claim 1, wherein the connection arrangement additionally comprises a first lock, fastened to the passenger door, and which is configured to:
fix the mechanism in a position on the passenger door, at least when the passenger door is in the raised state, before the transition from disarming to arming of the escape slide, and
engage with the external engagement means when the passenger door is in the lowered state, in order to release the mechanism from the passenger door or release the mechanism from the girt bar.

6. The passenger door arrangement as claimed in claim 5, wherein the mechanism comprises a slider, formed as one piece, that is displaceable relative to the girt bar, and comprising:
a first portion, which is arranged substantially parallel to a direction of displacement of the slider and above the girt bar,
a second portion, which is arranged substantially perpendicularly in relation to the direction of displacement of the slider and to a side of the girt bar, and
a third portion, which is arranged substantially parallel to the direction of displacement of the slider and beneath the girt bar, and,
wherein before a transition from disarming to arming, the first portion not crossing the main direction of movement of the girt bar, and the third portion crossing the main direction of movement of the girt bar, such that the slider is not in engagement with the girt bar, and
wherein following the transition from disarming to arming, the first portion and the third portion each crossing the main direction of movement of the girt bar, such that the slider is in engagement with the girt bar.

7. The passenger door arrangement as claimed in claim 5, wherein the mechanism comprises a two-piece slider that is displaceable relative to the girt bar, and comprising:
a first sub-component, having:
a first component, which is arranged substantially parallel to the direction of displacement of the first sub-component and, when the first sub-component has been connected to the girt bar, is arranged above the girt bar,
a second portion, which is arranged substantially perpendicularly in relation to the direction of displacement of the first sub-component and, when the first sub-component has been connected to the girt bar, is arranged to the side of the girt bar,
a third portion, which is arranged substantially parallel to the direction of displacement of the first sub-component and, when the first sub-component has been connected to the girt bar, is arranged beneath the girt bar, and,
wherein before the transition from disarming to arming, the first portion and the third portion each crossing the main direction of movement of the girt bar, such that the first sub-component of the two-piece slider is in engagement with the girt bar and,
wherein following the transition from disarming to arming, neither the first portion nor the third portion crossing the main direction of movement of the girt bar, such that the first sub-component of the two-piece slider is not in engagement with the girt bar.

8. The passenger door arrangement as claimed in claim 5, wherein the mechanism comprises a two-piece slider that is displaceable relative to the girt bar, and further comprising:
a second sub-component, having:
a first portion, which is arranged substantially parallel to the direction of displacement of the first sub-component and, when the second sub-component has been connected to the girt bar, is arranged above the girt bar,
a second portion, which is arranged substantially perpendicularly in relation to the direction of displacement of the second sub-component and, when the second sub-component has been connected to the girt bar, is arranged to the side of the girt bar,
a third portion, which is arranged substantially parallel to the direction of displacement of the first sub-component and, when the second sub-component has been connected to the girt bar, is arranged beneath the girt bar, and,
wherein before the transition from disarming to arming, neither the first portion nor the third portion crossing the main direction of movement of the girt bar, such that the second sub-component of the slider is not in engagement with the girt bar and,
wherein following the transition from disarming to arming, the first portion and the third portion each crossing the main direction of movement of the girt bar, such that the second sub-component of the two-piece slider is in engagement with the girt bar.

9. An aircraft segment, comprising
the passenger door arrangement as claimed in claim 1, and
a fuselage portion, the external engagement means being fixed to the fuselage portion.

10. An aircraft segment, comprising
the passenger door arrangement as claimed in claim 5, and
a fuselage portion, the external engagement means being fixed to the fuselage portion, and,
wherein the external engagement means comprises a first pin, which is configured to engage with the first lock, and to raise the first lock in such a manner that the mechanism is released from the passenger door, or the mechanism is released from the girt bar.

11. The aircraft segment as claimed in claim 10, wherein the external lock comprises a second lock which is fastened to the fuselage portion, and
wherein the connection arrangement additionally comprises a second pin, fastened to the passenger door, and which is configured to engage with the second lock when the passenger door is in the lowered state, and
wherein when the escape slide is in the armed state, in the case of the passenger door being brought out of its lowered state and into its raised state, the second pin being configured to raise the second lock, in such a manner that the mechanism becomes fixed in engagement with the girt bar.

12. A passenger door arrangement for an aircraft segment, comprising:
a passenger door, which configured to be moved, relative to a fuselage portion that accommodates the passenger door, between a raised position and a lowered position, and
a girt bar, for arming or disarming an escape slide, configured to be connected to the passenger door, to the fuselage portion, or both by a connection arrangement, the connection arrangement being configured, in the case of arming of the escape slide, to hold the girt bar fixed relative to the passenger door when the girt bar is in a lowered position, and
wherein the connection arrangement comprises:
a mechanism that is configured to releasably lock and fix the girt bar to an external engagement means fastened to the fuselage portion,
a first lock, fastened to the passenger door, and which is configured to:
fix the mechanism in a position on the passenger door, at least when the passenger door is in the raised state, before the transition from disarming to arming of the escape slide, and
engage with the external engagement means when the passenger door is in the lowered state, in order to release the mechanism from the passenger door or release the mechanism from the girt bar,
a slider, formed as one piece, that is displaceable relative to the girt bar, and comprising:
a first portion, which is arranged substantially parallel to a direction of displacement of the slider and above the girt bar,
a second portion, which is arranged substantially perpendicularly in relation to the direction of displacement of the slider and to a side of the girt bar, and
a third portion, which is arranged substantially parallel to the direction of displacement of the slider and beneath the girt bar, and,
wherein before a transition from disarming to arming, the first portion not crossing the main direction of movement of the girt bar, and the third portion crossing the main direction of movement of the girt bar, such that the slider is not in engagement with the girt bar, and
wherein following the transition from disarming to arming, the first portion and the third portion each crossing the main direction of movement of the girt bar, such that the slider is in engagement with the girt bar.

13. An aircraft segment, comprising
a passenger door arrangement, and
a fuselage portion having external engagement means fixed to the fuselage portion,
wherein the passenger door arrangement comprises:
a passenger door, which configured to be moved, relative to the fuselage portion that accommodates the passenger door, between a raised position and a lowered position, and
a girt bar, for arming or disarming an escape slide, configured to be connected to the passenger door, to the fuselage portion, or both by a connection arrangement,
the connection arrangement being configured, in the case of arming of the escape slide, to hold the girt bar fixed relative to the passenger door when the girt bar is in a lowered position, and
wherein the connection arrangement comprises:
a mechanism that is configured to releasably lock and fix the girt bar to the external engagement means fixed to the fuselage portion,
a first lock, fastened to the passenger door, and which is configured to:
fix the mechanism in a position on the passenger door, at least when the passenger door is in the raised state, before the transition from disarming to arming of the escape slide, and
engage with the external engagement means when the passenger door is in the lowered state, in order to release the mechanism from the passenger door or release the mechanism from the girt bar, and
wherein the external engagement means comprises a first pin, which is configured to engage with the first lock, and to raise the first lock in such a manner that the mechanism is released from the passenger door, or the mechanism is released from the girt bar.

* * * * *